(12) United States Patent  
Kreymerman

(10) Patent No.: US 6,621,549 B1
(45) Date of Patent: Sep. 16, 2003

(54) FIBER OPTIC FLAT PANEL LIQUID CRYSTAL DISPLAY

(75) Inventor: Grigoriy Kreymerman, Pembroke Pines, FL (US)

(73) Assignee: Florida Atlantic University, Boca Raton, FL (US)

( * ) Notice: Subject to any disclaimer, the term of this patent is extended or adjusted under 35 U.S.C. 154(b) by 0 days.

(21) Appl. No.: 09/563,276

(22) Filed: May 3, 2000

Related U.S. Application Data

(60) Provisional application No. 60/132,200, filed on May 3, 1999.

(51) Int. Cl.[7] ............................................. G02F 1/1333
(52) U.S. Cl. ....................................... 349/159; 349/202
(58) Field of Search ........................................... 349/159

(56) References Cited

U.S. PATENT DOCUMENTS 5,596,671 A * 1/1997 Rockwell, III .............. 385/147

OTHER PUBLICATIONS

Haijun Yuan and Peter Palffy–Muhoray, "Waveguide Based Liquid Crystal Display", Published Aug. 31, 1999, in Mol. Cryst. Liq. Cryst. 331, 491–498, and presented at Seventeenth International Liquid Crystal Conference, Strasbourg, France, Jul. 19–24, 1998.

* cited by examiner

Primary Examiner—Tarifur Chowdhury
Assistant Examiner—T. L. Rude
(74) Attorney, Agent, or Firm—Martin Novack

(57) ABSTRACT

A display panel which employs semiconductor light sources, fiber optics, liquid crystal and a switching matrix to obtain efficient display.

11 Claims, 2 Drawing Sheets

FIBER OPTIC FLAT PANEL LIQUID CRYSTAL DISPLAY

RELATED APPLICATION

This Application claims priority from U.S. Provisional Patent Application No. 60/132,200, filed May 3, 1999.

FIELD OF THE INVENTION

This invention relates to flat panel optical displays.

DESCRIPTION

Figure 1:
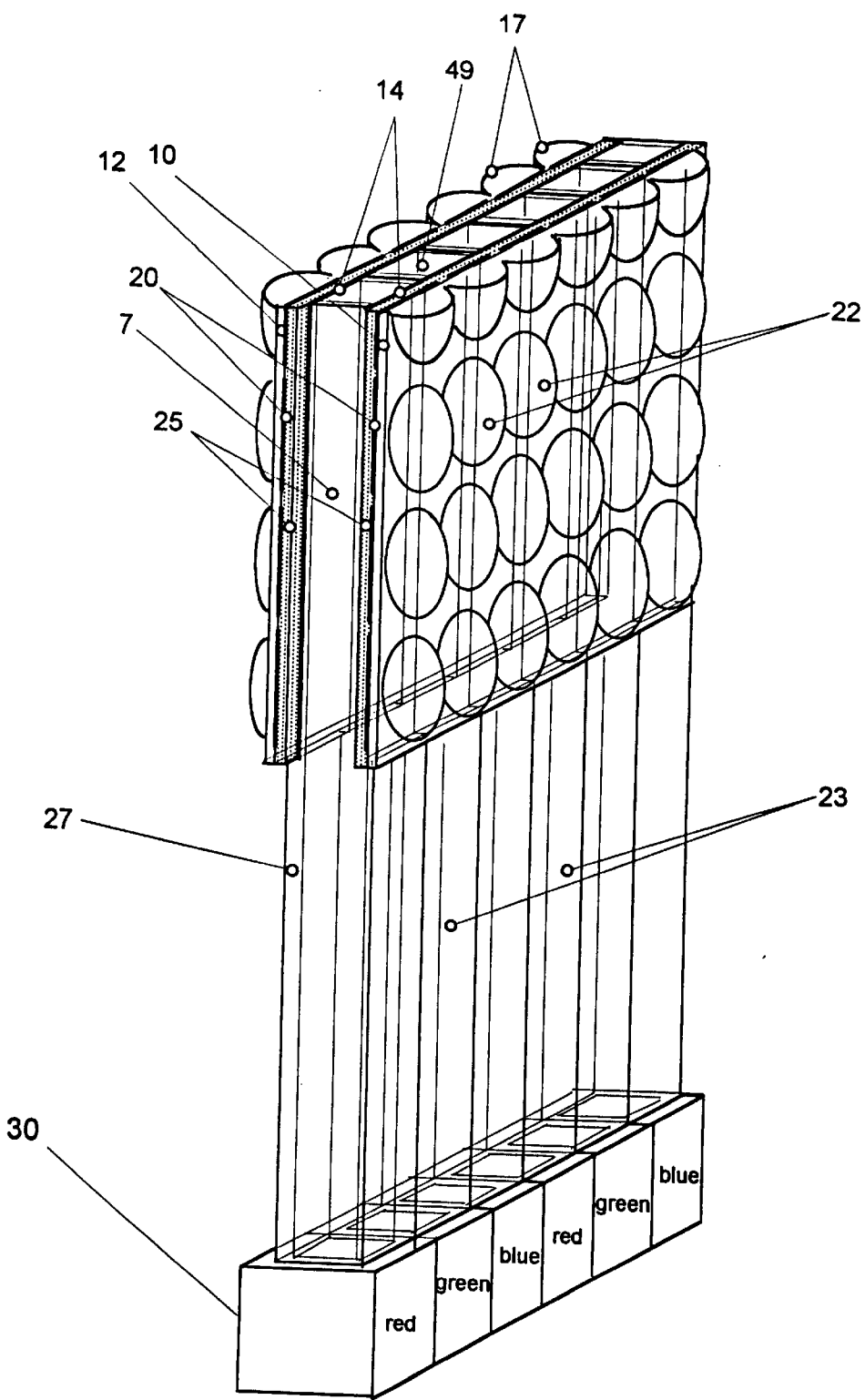
FIG. 1 is a diagram, partial in cross-section, of an embodiment of a display panel in accordance with the invention.

The invention refers to a fiber optic flat panel liquid flat panel liquid crystal display, which can compete with existing flat screen displays such as LCD displays. The fiber optic display (FIG. 1) is assembled of many optical fibers (7) with square cross section without cladding from two opposite sides, packed vertically along the axes, adjacent to each other between two plates (10, 12). The two opposite sides of the fiber assembly are coated with a thin film, which is light-transparent and electro-conductive (14). The front plate (10) and back plate (12) have a switching matrix (or active matrix addressing) architecture (20) on the inner surfaces, similar to LCD displays. The simplicity of the switching architecture is advantageous as compared with the more complex active matrix addressing especially for large displays. The front plate (10) has a monolithic lens matrix (22) on the outer surface. The back plate (12) has a matrix of concave mirrors (17) on the outer surface, which reflects light towards the front of the panel. The space between these plates and optical fiber is filled with liquid crystal (LC) material (25). The optical fibers (23) exiting from the bottom of the display have a cladding (27) on all four sides and are coupled to the linear array (30) of semiconductor lasers or LED's of three colors, red, green and blue. The other ends of the optical fibers on the top of the display are coated with mirror surfaces (40) (FIG. 2) to reduce the loss of light.

Figure 2:
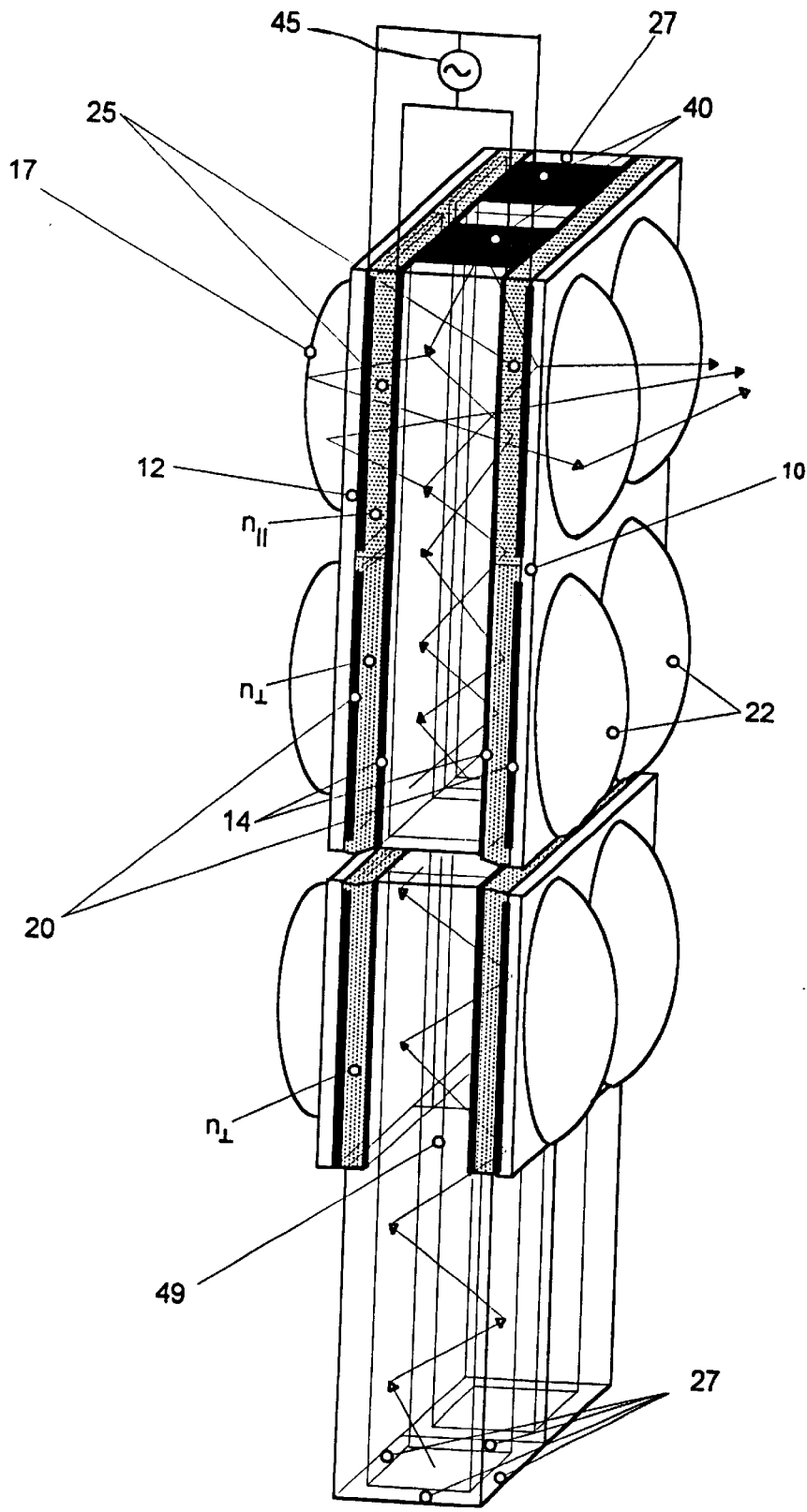
FIG. 2 is a diagram, partially in cross-section, of a portion of the FIG. 1 embodiment, which illustrates operation of the invention.

LC material is a cladding for optical fiber with an index of refraction, which can change locally, where an electric field is applied (45) (FIG. 2). The index of refraction can change from a minimum value n1 (at zero voltage) that supports propagation of the light inside the fiber (47) to a maximum value n|| (at maximum voltage) that allows emission of light from the fibers' core (49) through the LC (25) and front plate (10) to the outside. n⊥ is the index of refraction perpendicular to the molecule of LC material and n|| is the index of refraction parallel to the molecule of LC material. The orientation of molecules of the LC material (25) locally changes from parallel to perpendicular, relative to the axis fibers, when an electric field is applied. At the same time, n⊥ is congruent with the index of refraction of the fiber optic cladding (27) $n_{cl}$ and n|| is much greater than the index of refraction of the fiber optic core (49) $n_{co}$ ($n_{co}>n_{cl}$)

The intensity of the light emitted from each pixel of the display can be gradually changed by changing the intensity of light from the LED simultaneously with changing (scanning) rows in the switching architecture when the electric field is applied locally to the matrix element across the plates (panel). Each optical fiber, with a certain color of light, aligns to the corresponding elements of an addressing architecture. The short sections of optical fiber between plates, with single matrix elements, represent one third of the pixel size. In other words, control over the value of luminance from the pixel can be performed by controlling the power of light from a light source (addressing of light source arrays). This option allows an increase in the size of display without increasing the complexity of the architecture that reduces yield at production.

For display with an active matrix addressing architecture, intensity of the light from the pixels can be controlled by gradually changing the index of refraction locally where an electric field is applied instead of changing the intensity of the light from the LED. However, this architecture increases the complexity of the display when increasing size.

The addressing (scanning) of the display can be performed horizontally with differing scanning rates, of which 60 HZ is an example. The horizontal addressing (perpendicular to the fiber optic axes) has the same advantage, especially when the whole row addressing is simultaneous. In this case, losses along the fiber due to radiation of light outside the optical fiber can be neglected.

The vertical resolution of the display can be defined by the number of rows of switching architecture. The horizontal resolution is defined by the quantity of the optical fibers. For example, VGA monitors with 640×480 pixels require 640× 3=1920 optical fibers coupled to three of 640 light source arrays of three colors, red, green and blue. The total number of light sources is 640×3=1920. The cross dimension of optical fiber can vary from hundreds of microns to the few millimeters. Therefore, given an optical fiber with cross section 1×1 mm, the width of the display will be 1.9 m.

The advantage of this display compared with regular LCD panels is the higher power efficiency realized because no polarization of light is required. The light from efficient light sources delivered by optical fiber, with a minimum of loss directly to the point of radiation from the display, can be realized. The Fiber Optic LCD display can be brighter with higher dynamic range of pixel luminance and higher contrast. The possibility of bending the display's panel in a curved arrangement is another advantage.

What is claimed is:

1. A display panel, comprising:

a linear array of adjacent optical fibers having opposing flat surfaces coated with a light-transparent electro-conductive film;

a switching matrix having elements that form rows across the linear array of optical fibers;

electro-optical material disposed between said coated optical fibers and the elements of said switching matrix;

a linear array of intensity controllable light sources coupled into respective ends of said linear array of adjacent optical fibers;

a two-dimensional lens matrix having lenslets disposed, with respect to each fiber, at each row position, said two-dimensional lens matrix being disposed on one side of said array of optical fibers; and a two dimensional matrix of concave mirrors disposed on the opposing side of said array of optical fibers;

whereby, under control of said light sources and said switching matrix, light is emitted via lenslets of said lens matrix.

2. The display panel as defined by claim 1, wherein said light sources are semiconductor lasers.

3. The display panel as defined by claim 1, wherein said light sources are light-emitting diodes.

4. The display panel as defined by claim 1, wherein said light sources include sources of different colors.

5. The display panel as defined by claim 4, wherein said source colors are red, blue, and green.

6. The display panel as defined by claim 1, wherein said optical fibers have square cross-sections.

7. The display panel as defined by claim 2, wherein said optical fibers have square cross-sections.

8. The display panel as defined by claim 5, wherein said optical fibers have square cross-sections.

9. The display panel as defined by claim 1, wherein said electro-optic material is liquid crystal material.

10. The display panel as defined by claim 1, wherein said electro-optic material is liquid crystal material.

11. The display panel as defined by claim 5, wherein said electro-optic material is liquid crystal material.

* * * * *